United States Patent
Strassenburg-Kleciak (10) Patent No.: US 8,670,936 B2
(45) Date of Patent: Mar. 11, 2014

(54) METHOD AND DEVICE FOR DISPLAYING ROAD SEGMENTS AND METHOD OF PROVIDING A MAP DATA BASE

(75) Inventor: Marek Strassenburg-Kleciak, Garching (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 188 days.

(21) Appl. No.: 13/300,164

(22) Filed: Nov. 18, 2011

(65) Prior Publication Data

US 2012/0130637 A1     May 24, 2012

(30) Foreign Application Priority Data

Nov. 18, 2010   (EP) .................................... 10191721

(51) Int. Cl.
*G01C 21/34* (2006.01)

(52) U.S. Cl.
USPC ....... 701/533; 701/409; 701/428; 340/995.17

(58) Field of Classification Search
USPC ......... 701/409, 411, 428, 472, 523, 527, 533; 340/995.14, 995.15, 995.17, 995.23
See application file for complete search history.

(56) References Cited

U.S. PATENT DOCUMENTS

| | | | |
|---|---|---|---|
| 5,928,307 A * | 7/1999 | Oshizawa et al. ............. | 701/411 |
| 6,622,085 B1 | 9/2003 | Amita et al. | |
| 6,636,804 B1 | 10/2003 | Joshi | |
| 6,947,064 B1 * | 9/2005 | Hahn et al. ..................... | 701/301 |
| 7,356,405 B1 | 4/2008 | Nesbit | |
| 8,150,611 B2 * | 4/2012 | Mukherjee .................... | 701/118 |
| 2004/0243533 A1 * | 12/2004 | Dempster et al. ................ | 707/1 |
| 2010/0286907 A1 * | 11/2010 | Hilbrandie et al. ........... | 701/201 |
| 2011/0040438 A1 * | 2/2011 | Kluge et al. .................... | 701/29 |

* cited by examiner

*Primary Examiner* — Gertrude Arthur Jeanglaude
(74) *Attorney, Agent, or Firm* — O'Shea Getz P.C.

(57) ABSTRACT

A method and device for displaying road segments are provided. The method uses a map data base storing information on a road network in a road vector data format. Additional parameter values are stored for a subset of road segments. Information on a direction vector and the parameter value for a road segment are retrieved. Based on the parameter value, it is determined whether the road segment exhibits a variation in shape as a function of position along its direction vector. A graphical representation of the road segment is generated based on the retrieved parameter value and the direction vector.

18 Claims, 6 Drawing Sheets

METHOD AND DEVICE FOR DISPLAYING ROAD SEGMENTS AND METHOD OF PROVIDING A MAP DATA BASE

CLAIM OF PRIORITY

This patent application claims priority from EP Application No. 10 191 721.9 filed Nov. 18, 2010, which is hereby incorporated by reference.

FIELD OF TECHNOLOGY

The invention relates to a method and a device for displaying road segments via an optical output device and a method of providing a map data base. The invention relates in particular to methods and devices that may be utilized to display portions of a road network in vehicular navigation using a map data base that stores information on a road network in a road vector data format.

RELATED ART

Navigation devices are now widely used in motor vehicles, and may be fixedly or removably installed in the vehicle. Navigation devices assist a driver in route planning and provide driving directions as well as information on portions of a road network. To provide a graphical representation of a portion of a road network, a map data base is accessed.

Information on road segments that can be utilized for generating graphical representations of road segments may be stored in the map data base in various forms. Frequently, a road vector data format is used. Roads are approximated by a sequence of linear road segments, each of which has a direction vector. In this case, curved roads may be partitioned into plural road segments, each of which can be approximated as being essentially straight. Different variants of map data bases that utilize a vector representation are known.

When a portion of a road network is to be displayed, the information on the direction vectors of the road segments that are to be displayed is retrieved from the map data base. Based on the direction vectors, instances of the road segments are generated on a display device. Frequently, instances of road segments are generated based on the assumption that the road segment has a rectangular shape in plan view, i.e., that the road segment has a uniform width along its longitudinal direction given by the direction vector. In a plan view, the instance of the road segment is then generated to have a rectangular shape. In a panoramic or perspective view, the instance of the road network on the display device exhibits a variation in width due to perspective distortion, while the perspective view is still generated based on the assumption that the road segment has a uniform width along its direction vector. The width may respectively be stored as an attribute in the map data base, or may be determined based on a road class attribute of the road to which the road segment belongs.

While the assumption that road segments defined by a direction vector have, in plan view, a generally rectangular shape and are homogeneous along their direction vector may be acceptable for many road segments, it may be desirable to display road segments to a greater level of detail in some cases. For example, for roads having one end which does not allow vehicles to exit, it may be desirable for the driver of a vehicle to obtain additional information on the road boundaries in proximity to the end of the road segment. In particular, it may be desirable for the driver of the vehicle to know whether there is a turning area at the end of a dead-end road. While some additional information on the shape of the road at its end may be provided by segmenting the turning area into a plurality of essentially straight road segments and by storing corresponding direction vectors in the map data base, this approach may be undesirable with a view to storage space.

There is need in the art for methods and devices for displaying road segments and providing a map data base that address the above needs. In particular, there is a need in the art for such methods and devices that allow road segments to be displayed to a greater level of detail. There is also a need in the art for methods and devices that keep the additional storage space required for allowing a greater variety of road segment shapes to be displayed at moderate levels.

SUMMARY OF THE INVENTION

A method of displaying road segments via an optical output device uses a map data base comprises information on a road network in a road vector data format, in which a road segment is respectively represented by a vector. A road segment for outputting via the optical output device is identified. Information on a direction vector of the identified road segment and a parameter value associated with the identified road segment are retrieved from the map data base. Based on the retrieved parameter value, a variation in shape of the identified road segment along a direction of the road segment defined by the direction vector is selectively determined. A graphical representation of the road segment for outputting via the optical output device is generated based on the information on the direction vector and, if available, the determined variation in shape.

A parameter value associated with the road segment is retrieved from the map data base that stores the road segments as vectors defined by a 2-tuple indicating their direction vector. The variation in shape along the longitudinal direction of the road segment can be determined based on the retrieved parameter value. This allows changes in the shape of the road segment, in particular changes in width along the longitudinal axis of the road segment as defined by the direction vector, to be taken into account when generating the graphical representation of the road segment. The additional storage space required to provide for this enhanced versatility in displaying road segments is kept to relatively moderate levels. Roads can still be represented by a series of direction vectors, there being a one-to-one correspondence between a direction vector and a straight road segment, while specific road segments, such as road segments having an end that does not allow vehicles to exit, are provided with a parameter value to account for a variation in shape along the direction vector of the respective road segment.

The terms "selectively determining", "selectively determine" and similar are to be construed such that, depending on the retrieved parameter value, it may not always be required or possible to determine a variation in shape. For example, there may be parameter values indicating that the road segment has a constant width as a function of position along its direction vector, and there may be other parameter values indicating that the road segment has a varying shape as a function of position along its direction vector. The variation in shape may be determined only in cases in which the parameter value is such that it indicates that the shape of the road segment varies along the longitudinal axis of the road segment.

The graphical representation of the road segment may be generated on a display device of a navigation apparatus. The graphical representation may be generated as part of a plan view map or as a part of a perspective view.

Based on the retrieved parameter value, a graphical representation of a turning area at an end portion of the road segment may be generated according to the determined variation in shape. Such information is helpful for a driver to determine for example whether a dead-end road should be entered.

The parameter value that is utilized to selectively determine a variation in shape does not need to be retrieved for all road segments. The method may include determining, based on the map data base, whether the identified road segment has an end that does not allow vehicles to exit the identified road segment. The parameter value may be selectively retrieved only if the identified road segment has an end that does not allow vehicles to exit the identified road segment. Similarly, the variation in shape may be selectively determined only if the identified road segment has an end that does not allow vehicles to exit the identified road segment. Information on whether a road segment is linked, at its ends, to other road segments is readily available from map data bases having road vector data format.

The map data base may respectively include data fields associated with roads that include road segments. The data fields may comprise information on a direction vector of the respective road segment. If the respective road segment has an end that does not allow vehicles to exit, the associated data field may further include a parameter value indicative of a template shape at the end which does not allow vehicles to exit. The template shape may be one of a plurality of template shapes. The data field may include the parameter value only if the associated road segment is a road segment that has an end which does not allow vehicles to exit.

Based on the retrieved parameter value, at least one additional parameter value associated with the identified road segment may be selectively retrieved from the map data base. The variation in shape may be determined based on the retrieved parameter value and the at least one additional parameter value. The at least one additional parameter value allows a greater variety in shapes of, for example, turning areas to be displayed.

The parameter value may be indicative of a shape template indicating, for example, the shape of a turning area at the end of the road segment. There may be a finite set of shape templates. The shape templates may include for example a polygonal extension of the road segment, a square-shaped extension of the road segment, an extension having an elliptical or circular boundary portion, or other shapes. The at least one additional parameter value may quantify the dimensions of the template shape as defined by the parameter value.

A number of the at least one further parameter value to be retrieved may be determined based on the retrieved parameter value. This allows the map data base to be configured such that the data field associated with a road segment includes only the further parameter values required for further defining the variation in shape indicated by the parameter value.

A variation in width of the identified road segment as a function of position along its direction vector may be determined based on the retrieved parameter value and the at least one further parameter value. The width may be determined as a function of longitudinal position along the road segment, based on the retrieved parameter value and the at least one additional parameter value. The retrieved parameter value may be utilized to determine whether the width changes, continuously or discontinuously, as a function of position along the direction vector. The retrieved parameter value may be utilized to determine whether the width of the road segment, as a function of position along the direction vector, changes such that the road segment, in a plan view, has a symmetrical or asymmetrical shape. The retrieved parameter value and the at least one further parameter value may be utilized to determine the positions of the boundaries of the road segment relative as a function of position along the direction vector. A realistic representation of most turning areas or other road segment extensions that are conventionally found in road networks may be generated, while only a moderate additional data amount has to be stored in the map data base.

A length of a section of the identified road segment in which the identified road segment exhibits the variation in shape may be determined based on the at least one additional parameter value.

The graphical representation of the road segment may be generated such that, based on the retrieved parameter value, it selectively exhibits a boundary having a curved portion. Thereby, road segment extensions, such as turning areas, may be displayed in a realistic manner even when they have a smoothly curved boundary.

The retrieved parameter value for the identified road segment may be compared to a finite set of values to determine the variation in shape of the identified road segment. The various values included in the set of values may be indicative of different shape templates. The various values may be for example numerical values, alphanumerical values, string values or other suitable values. The map data base may store a parameter value selected from the finite set of values for road segments having an end which does not allow vehicles to exit the road segment.

The parameter value and, if applicable, the at least one further parameter value may not only be used for displaying the road segments. The information may also be used for route search, outputting warning signals or other navigation purposes. For illustration, a cost model for a route determination may be adjusted based on the retrieved parameter value, and a route search may be performed based on the adjusted cost model. To adjust the cost model, the cost value of road segments having an end which does not allow vehicles to exit may be increased based on the shape and/or dimensions of a turning area, as defined by the parameter value and the at least one further parameter value. Adjusting the cost model may include comparing the shape and/or dimensions of a turning area, as defined by the parameter value and the at least one further parameter value, to at least one vehicle dimension.

According to another aspect of the present invention, a computer program product is provided. The computer program product comprises instruction code which, when executed by a processor of a computing device, directs the processor to perform the method of displaying road segments of any one aspect or embodiment described herein. The computer program product may be implemented by instruction code stored on a storage medium, in particular a non-transitory storage medium.

According to another aspect, a device for displaying road segments is provided. The device comprises a storage device configured to store map data information on a road network in road vector data format, in which a road segment is respectively represented by a vector. The device comprises an optical output device. The device comprises a processor which is configured to identify a road segment for outputting via the optical output device; to retrieve from the storage device information on a direction vector for the identified road segment and a parameter value associated with the identified road segment; to selectively determine, based on the retrieved parameter value, a variation in shape of the identified road segment along a direction defined by the information on the direction vector; and to control the optical output device based on the information on the direction vector and, if available, the determined variation in shape, to generate a graphical representation of the identified road segment.

A parameter value associated with the road segment may be retrieved from the storage device that stores road segments as a vector. The processor determines the variation in shape along the direction vector based on the retrieved parameter value. This allows changes in the shape of the road segment, in particular changes in width along the direction vector of the road segment, to be taken into account when generating the graphical representation of the road segment. The additional storage space required to provide for this enhanced versatility in displaying road segments is kept at moderate levels.

The device may be configured as a navigation device installed in, or configured to be installed in, a vehicle.

According to another aspect, a method of providing a map data base for vehicle navigation is provided. The map data base is of a type in which a direction vector is respectively stored in the map data base for a plurality of road segments. Information on a road segment which has a direction vector is received. The information includes information on a boundary of the road segment. Based on the information on the boundary, it is determined whether the road segment exhibits a variation in shape along the direction of the road segment as defined by the direction vector. If the road segment exhibits the variation in shape, a parameter value is selected from a finite set of parameter values based on the variation in shape and is assigned to the road segment. The selected parameter value is stored in the map data base as an attribute of the road segment.

The map data base provided by this method may be utilized in the methods and devices for displaying road segments according to the various aspects and embodiments. In particular, the method may be utilized to provide a map data base in which road segments that have an end which does not allow a vehicle to exit are assigned a parameter value, which is indicative of a template shape and which is stored in the map data base for subsequent use in displaying the road segment.

A variation in width of the road segment as a function of position along the direction vector may be determined to establish whether the road segment exhibits a variation in shape. The variation in width may be compared to a threshold to determine whether the road segment exhibits a variation in shape.

The variation of the width of the road segment may be monitored only if the road segment has an end which does not allow vehicles to exit the road segment at the end. In this case, the variation of the width may be monitored in a proximity of the end where vehicles cannot exit. As a result, the characteristics of a turning area may be identified.

Characteristics of the boundary of the road segment may be determined, and the parameter value may be selected based on the determined characteristics. The determined characteristics may include one or more of information on whether or not the boundary of the road segment is symmetrical relative to a longitudinal axis of the road segment defined by the direction vector; information on a radius of curvature of the boundary; and information on whether or not the road segment defines a simply connected area. If the road segment has an end that does not allow vehicles to exit, the shape of end region of the road segment may be compared to plural predefined shape templates, and the parameter value may be assigned based on the comparison.

At least one additional parameter may be determined based on the information on the boundary of the road segment. The at least one further parameter may quantify dimensions of a turning area or other road segment extension, for example the length and width of a turning area.

It is to be understood that the features mentioned above and those yet to be explained below can not only be used in the respective combination indicated, but that other embodiments may be implemented that include those features in other combinations or in isolation.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

Embodiments will be described with reference to the accompanying drawings.

DETAILED DESCRIPTION OF THE INVENTION

Hereinafter, embodiments of the invention will be described with reference to the drawings. It is to be understood that the present invention is not limited to the specific embodiments described herein and that the features of the various embodiments may be combined with each other unless explicitly stated otherwise.

The description of embodiments is given for the purpose of illustration and is not to be taken in a limiting sense. The drawings are to be regarded as being schematic representations only. Illustrated functional blocks or units shown in the drawings are not to be construed as indicating that these units necessarily are implemented as physically separate units. Rather, functional blocks or units shown or described may be implemented as separate units or may be combined into integrated units. Functional units may be implemented in hardware, software, or a combination thereof.

According to embodiments of the invention, methods of and devices for displaying road segments are provided. The methods and devices utilize a map data base having a road vector data format, in which roads are represented by one road segment or a sequence of concatenated road segments, each of which is represented by a vector. According to embodiments, the map data base has stored therein parameter values for at least a subset of the road segments. The map data base may store for example additional parameter values for road segments having an end that does not allow vehicles to exit the road segment, as is the case for the last road segment of a dead-end street. The parameter values define the shape of an outer boundary of the road segment at the end where vehicles are not allowed to exit.

Figure 1:
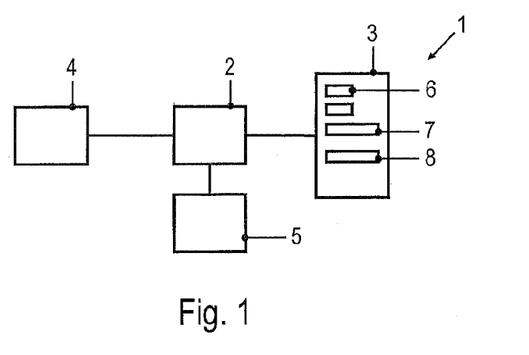
FIG. 1 is a block diagram illustration of a device for displaying road segments.

FIG. 1 is a block diagram illustration of a device 1 for displaying road segments. The device 1 includes a processor 2, a map data base 3, an optical output device 4 coupled to the processor 2 and an instruction set 5. The map data base 3, the optical output device 4 and the instruction set 5 are respectively coupled to the processor 2. The map data base 3 and the instruction set 5 may be stored in one physical storage device. The optical output device 4 may be implemented, for example, as a display screen or as an optical projection device. The device 1 may be a navigation device and may include additional components, such as for example a positioning unit for determining a current vehicle position, a receiver for receiving traffic information messages, a loudspeaker, or other units that can be integrated into a navigation device.

The map data base 3 stores data associated with road segments in a road vector data format. The data may be in the form of a plurality of data fields 6-8 or data base entries, each of which is associated with a road or road segment. Generally, each road segment is stored in the map data base as one vector, so that a road formed by a sequence of concatenated road segments is represented as a series of vectors. The data corresponding to a road segment includes at least information on the direction vector of the road segment. Additional information quantifying the widths or functional road classes of a road or of road segments may be included in the data fields 6-8 or may be stored separately. At least some data fields 7, 8 corresponding to roads that include at least one of a specific subset of road segments, such as a road segment having an end which does not allow vehicles to exit, include additional information specifying whether the respective road segment includes an extension at a portion thereof, which causes the shape of the road segment to significantly differ, in a plan view, from a rectangular shape. The data fields 7, 8 may include further information in the form of attributes which specify the shape of the extension and/or dimensions of the extension.

The map data base 3 may include data fields 7, 8 corresponding to dead-end roads. The data for the road segment having an end that does not allow vehicles to exit may include a parameter value indicative of whether or not there is a turning area at the end of the road segment. This parameter value will also be referred to as "type parameter value" in the following. The type parameter value may be selected from a finite set of values, each of which represents one of plural different template shapes of turning areas. If the type parameter value indicates that there is a turning area, the data field may include further parameters values quantifying at least one dimension of the turning area. The further parameter values will also be referred to as "dimension parameter values" in the following.

The processor 2 determines that a road segment is to be displayed. If the road segment belongs to the subset for which the map data base 3 stores information on an extension of the road segment, the processor 2 retrieves this information from the data field 7, 8. The information on the shape of the extension may include the type parameter value which is selected from a discrete set of values. To generate a graphical representation of the road segment, the processor 2 may retrieve the type parameter value. The processor 2 may then control the optical output unit 4 based on the type parameter value retrieved from the map data base 3.

In order to generate a graphical representation of a road segment having, for example, an end which does not allow vehicles to exit, the processor 2 may determine an outer boundary of the respective road segment based on the retrieved type parameter value. If available, the additional parameter values may also be utilized to determine the outer boundary of the respective road segment. For a plan view of a road network, the graphical representation of the road segment may be generated such that the road segment has a rectangular shape along a portion of its length, but has another portion with a width varying as a function of position along the direction vector. Correspondingly, the processor 2 may account for a varying width of the road segment when generating a perspective view for displaying. The processor 2 may determine a variation in width as a function of position along the direction vector, using the type parameter value and, if available, the dimension parameter values.

Instructions on how an instance of the road segment is to be generated can be retrieved from the instruction set 5. The instruction set 5 may include information defining the boundary of road segments having the various type parameter values. The instruction set 5 may store various procedures for generating instances of road segments. Each one of the procedures may be associated with one possible type parameter value. The processor 2 may retrieve one of the procedures based on the type parameter value associated with the road segment that is to be displayed. The procedure retrieved from the instruction set 5 may be invoked to generate a graphical representation of the road segment.

If it is desired to change the manner in which road segments having a specific type parameter value are to be displayed, such a change can be implemented by modifying the instruction set 5. For illustration, if the instruction set 5 stores plural procedures associated with the different possible type parameter values, only the procedure associated with a specific type parameter value needs to be modified in the instruction set 5 in order to implement a change in how road segments having this type parameter value are displayed.

In the device 1, roads corresponding to dead-end roads may still be stored in the form of one or more vectors defined by their direction. A greater level of detail may be attained when displaying the road segments by utilizing the type parameter value and, if available, the dimension parameter values to determine a change in shape of a terminal road segment along its direction vector. For another subset of the roads, namely roads that do not correspond to dead-end roads, the processor 2 may generate graphical representations of the road segments that form the road in a conventional way, for example based on the assumption that these road segments have a constant width along their direction vectors.

Figure 2:
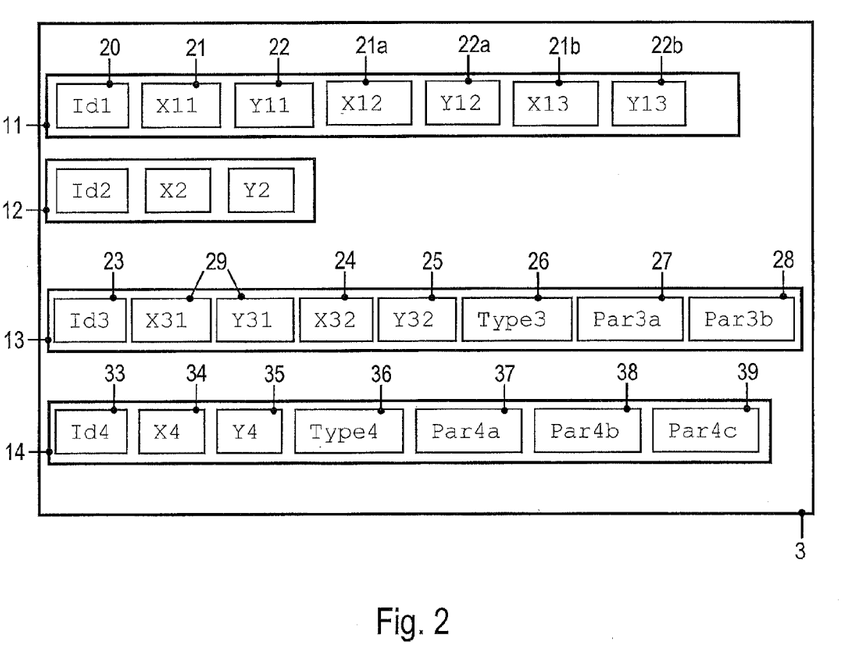
FIG. 2 is a schematic diagram of a map data base of the device of FIG. 1.

The information stored in the map data base 3 will be described in more detail with reference to FIG. 2. FIG. 2 is a schematic illustration of a map data base 3 which can be used in the device 1 of FIG. 1.

The map data base 3 includes a plurality of data fields 11-14, each of which is associated with one road. The data need not be organized such that all data associated with one road are grouped together. Each road comprises one or plural road segments, and each road segment may be defined by a direction vector. The information on the direction may be provided for example as a 2-tuple specifying the vector components.

The data field 11 includes an identifier and a plurality of direction vectors respectively given by 2-tuples 21 and 22, 21a and 22a, and 21b and 22b. The road represented by the data field 11 corresponds to a sequence of three concatenated straight road segments, where vehicles can exit the road on either side. Similarly, the data field 12 corresponds to a road having only one road segment and includes an identifier and a direction vector of the road segment.

The data fields 13 and 14 are associated with roads that include a road segment which exhibits a variation in shape along its direction vector. For example, the data fields 13 and 14 may correspond to dead-end roads. A parameter value and further parameter values are stored in the map data base 3 for the road segments which exhibit the variation in shape along their direction vector.

The data field 13 includes an identifier 23 for the road, direction information 29 of a first road segment and direction information 24, 25 of a second road segment. The end point of the second road segment is provided with additional information to account for the variation in shape of the road segment. The data field 13 includes a parameter value 26 that is selected from a finite set of values and specifies a variation in shape of the road segment along the direction vector 24, 25. The variation in shape may correspond to, for example, a variation in width as a function of position along the direction vector. The parameter value 26 may provide a classification of the road segment in relation to a plurality of template shapes.

Additional parameter values 27, 28 may provide information on the dimensions of the template shape, for the respective road segment. The number of additional parameter values 27, 28 included in the data field 13 may be set in dependence on the parameter value 26. For example, there may be template shapes of turning areas that require two additional parameter values 27, 28. There may be other template shapes of turning areas which requires more than the two additional parameter values 27, 28 to define the graphical representation of the road segment. There may also be road segments having an end that does not allow vehicles to exit which are not provided with a turning area at all. For this type of road segment, the type parameter value may indicate that the road segment has no turning area at its end, but no further parameter values need to be stored.

The data field 14 includes information generally similar to the one of the data field 13. The data field 14 may include an identifier 33, a direction vector 34, 35 of the only road segment forming the road represented by data field 14, and a parameter value 36 specifying a variation in shape along the direction defined by the direction vector 34, 35. The data field 14 includes for example three further parameter values 37-39 for defining the dimensions of the end portion of the road segment.

Additional information may be included in the data fields. For example, information on road classes, information on a road width or similar may also be included in the data fields or may be stored separately.

In the map data base 3, a subset of road segments is provided with additional parameters to account for a greater variety in shapes of, for example, road segments having an end where vehicles cannot exit. A map data base having this structure may be automatically generated. To this end, a subset of road segments may be identified. The subset of road segments may correspond to road segments having an end that does not allow vehicles to exit. Information on a boundary of the road segment at the end portion where vehicles cannot exit the road segment may be retrieved. The information on the boundary may be retrieved, for example, from cadastral maps or based on a quantitative evaluation of photo or video images. Characteristics of the boundary may be automatically determined. In order to determine the characteristics, one or plural of the following may automatically determined: symmetry or asymmetry of the end portion relative to a longitudinal center axis of the road segment; if the end portion is asymmetrical, whether the end portion extends further outwardly to the left or right of the longitudinal axis; discontinuities in the width of the road segment as a function of position along the direction vector; presence of sharp edges in the boundary; presence of smoothly curved boundary portions; whether or not the end portion is a singly connected area. According to the shape of the boundary of the turning area, a type parameter value may be selected from a finite set of values. Depending on the selected type parameter value, a number of further parameter values may be determined to quantify the dimensions of the end portion. The type parameter value and the further parameter values may be stored in the map data base. The method for providing a map data base which includes the type parameter value and the further parameter values may be performed by an electronic computing device.

FIGS. 3A-3J are schematic representations of various template shapes for road segments which may be used to classify road segments having an end which does not allow vehicles to exit. In a map data base, road segments having an end that does not allow vehicles to exit may be provided with a parameter value which indicates one of the template shapes. A graphical representation of the respective road segment is generated to have an end portion shaped as with the corresponding template shape. A direction vector of the road segments is respectively indicated at 50 in FIGS. 3A-3J.

Figure 3A:
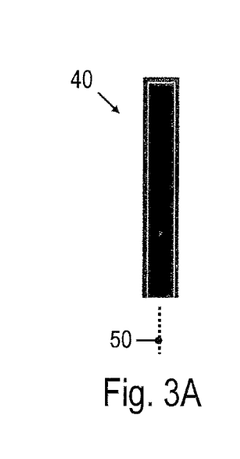
FIGS. 3A-3J are schematic illustrations of template shapes for illustrating a method of displaying road segments.

FIG. 3A shows a road segment 40 having an end which does not allow vehicles to exit, but which does not have a turning area. No further parameters are required to define such a road segment.

Figure 3B:
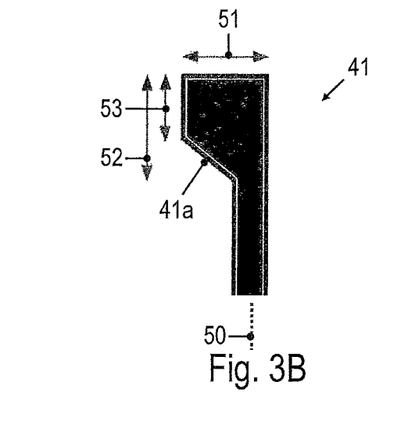
Figure 3C:
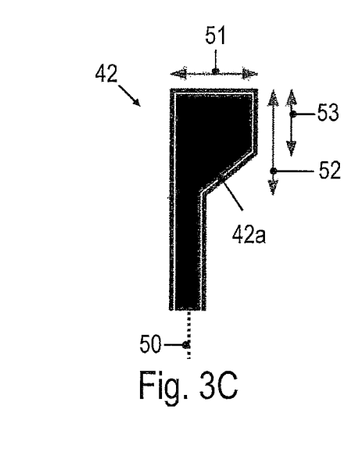

FIGS. 3B and 3C illustrate road segment shapes 41 and 42 having a polygon-shaped turning area 41a and 42a, respectively, at the end which does not allow vehicles to exit. The turning area is not symmetrical relative to the axis 50. The dimensions of the turning area are defined by a width 51, a length 52 over which the shape of the road segment varies along the direction of the road segment, and a length 53 over which the road segment exhibits the width 51. The parameters 51-53 will be stored in the map data base for road segments having a shape corresponding to one of the template shapes 41 and 42. Based on a parameter value specifying whether the road segment has a shape corresponding to template shape 41 or to template shape 42, the boundary can be determined using the parameters 51-53.

Figure 3D:
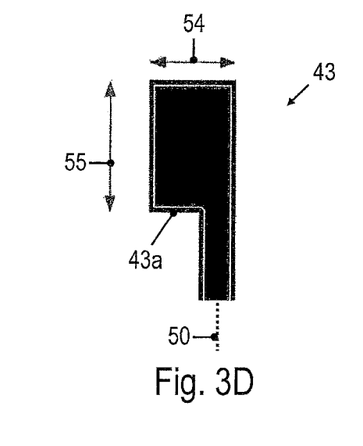
Figure 3E:
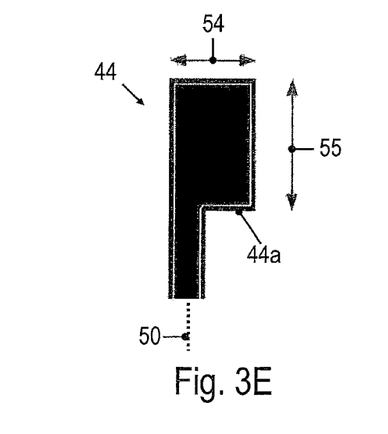

FIGS. 3D and 3E illustrate road segments shapes 43 and 44 having a rectangular turning area 43a and 44a, respectively, at the end which does not allow vehicles to exit. The turning area is not symmetrical relative to the axis 50. The dimensions of the turning area are defined by a width 54 and a length 55. Based on a parameter value specifying whether the road segment has a shape corresponding to template shape 43 or to template shape 44, the boundary can be determined using the parameters 54 and 55.

Figure 3F:
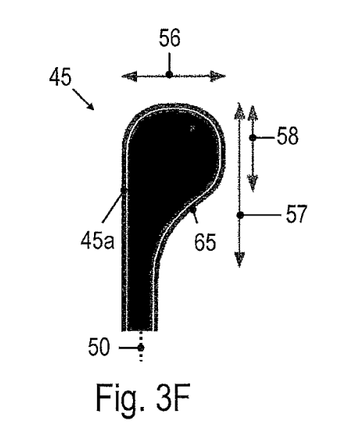
Figure 3G:
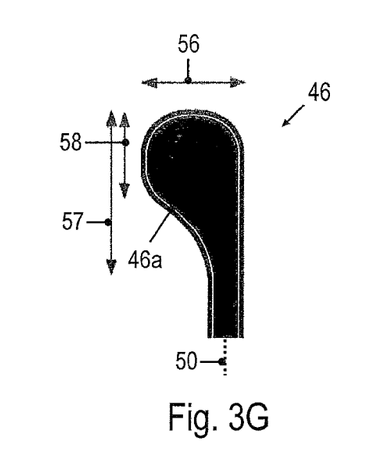

FIGS. 3F and 3G illustrate road segments shapes 45 and 46 having a turning area 45a and 46a, respectively, at the end that does not allow vehicles to exit. The turning area has a smoothly curved boundary 65. The turning area is not symmetrical relative to the axis 50. The dimensions of the turning area are defined by a width 56 and a total length 57 of the turning area. A second length 53 defines the position at which the turning area starts to smoothly narrow to the normal width of the road segment. Based on a parameter value specifying whether the road segment has a shape corresponding to template shape 45 or to template shape 46, the boundary can be determined using the parameters 56-58.

Figure 3H:
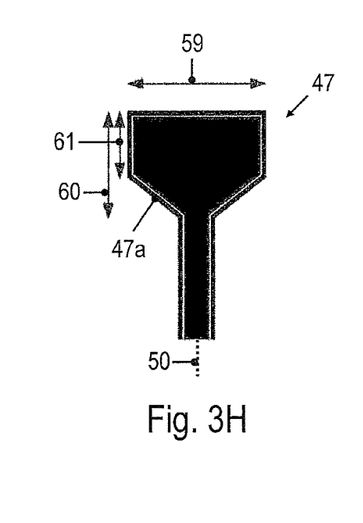

FIG. 3H illustrates a road segment shape 47 having a polygon-shaped turning area 47a at the end which does not allow vehicles to exit. The turning area is symmetrical relative to the axis 50. The dimensions of the turning area are defined by a width 59 and a total length 60 of the turning area. A second length 61 defines a position at which the turning area starts to linearly decrease in width, towards the normal width of the road segment. Based on a parameter value specifying whether the road segment has a shape corresponding to template shape 47, the boundary of the road segment can be determined using the parameters 59-61.

Figure 3I:
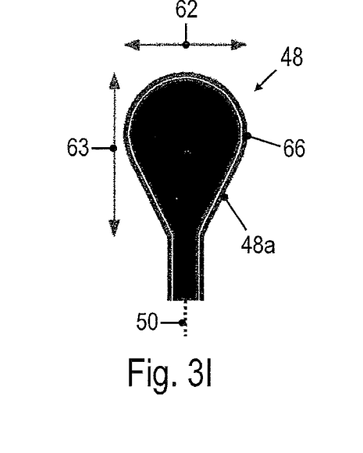

FIG. 3I illustrates a road segment shape 48 having a turning area 48a at the end that does not allow vehicles to exit. The turning area has a smoothly curved boundary 66. The turning area is symmetrical relative to the axis 50, and is a singly connected area. The dimensions of the turning area are defined by a width 62 and a length 63 of the turning area. based on a parameter value specifying whether the road segment has a shape corresponding to template shape 48, the boundary of the road segment can be determined using the parameters 62 and 63.

Figure 3J:
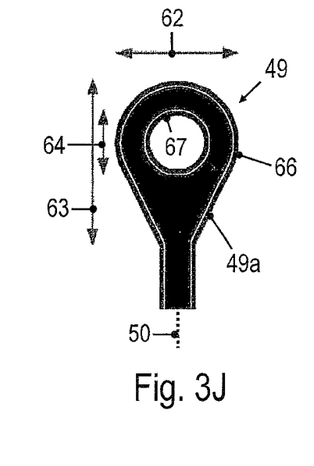

FIG. 3J illustrates a road segment shape 49 having a turning area 49a at the end that does not allow vehicles to exit. The turning area has a smoothly curved boundary 66, 67. The turning area is symmetrical relative to the axis 50. The turning area is not singly connected, but has a shape similar to a traffic circle. The dimensions of the turning area are defined by a width 62 and a length 63 of the turning area, and by a diameter 64 of the central portion through which a vehicle must not pass. Based on a parameter value specifying whether the road segment has a shape corresponding to template shape 49, the boundary of the road segment can be determined using the parameters 62-64.

Road segments having an end that does not allow a vehicle to exit may be compared to the template shapes 40-49. A type parameter value may be assigned to the road segments based on the comparison. For example, the template shapes of FIGS. 3A-3J may be labelled "0" to "9", and a numerical type parameter value in the range from 0 to 9 may be stored in the map data base for each road segment having an end that does not allow a vehicle to exit.

The displaying of road segments will be further explained with reference to FIGS. 4 and 5.

Figure 4A:
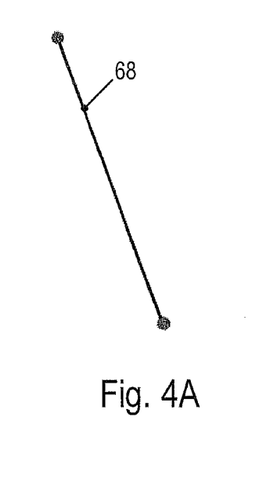
FIG. 4A illustrates a direction vector of a road segment.
Figure 4B:
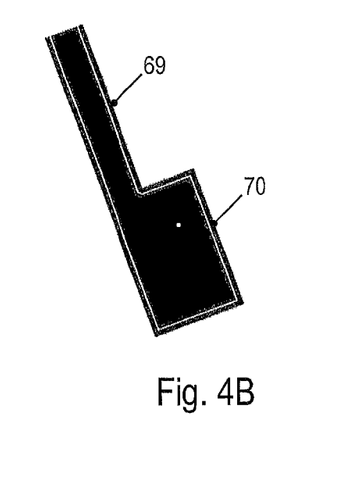
FIG. 4B illustrates a graphical representation of the road segment.

FIG. 4A illustrates an direction vector 68 for a road segment, wherein the vector is stored in the map data base. If the road segment corresponds to a dead-end road, additional parameters are provided in the map data base. Assuming, for example, that the road segment has a shape corresponding to the template shape 44 shown in FIG. 3E, the map data base will include a parameter value for the road segment indicating that the shape corresponds to this template shape 44. Two additional parameter values are stored in the map data base which define the length and width of the rectangular turning area. Using this information, a graphical representation 69 of the road segment as illustrated in FIG. 4B is generated. The road segment exhibits a variation in width along its direction vector, as indicated at 70. The turning area 70 may not only be displayed when the road network is shown in plan view, but the variation in width may also be taken into account when generating a perspective view.

Figure 5:
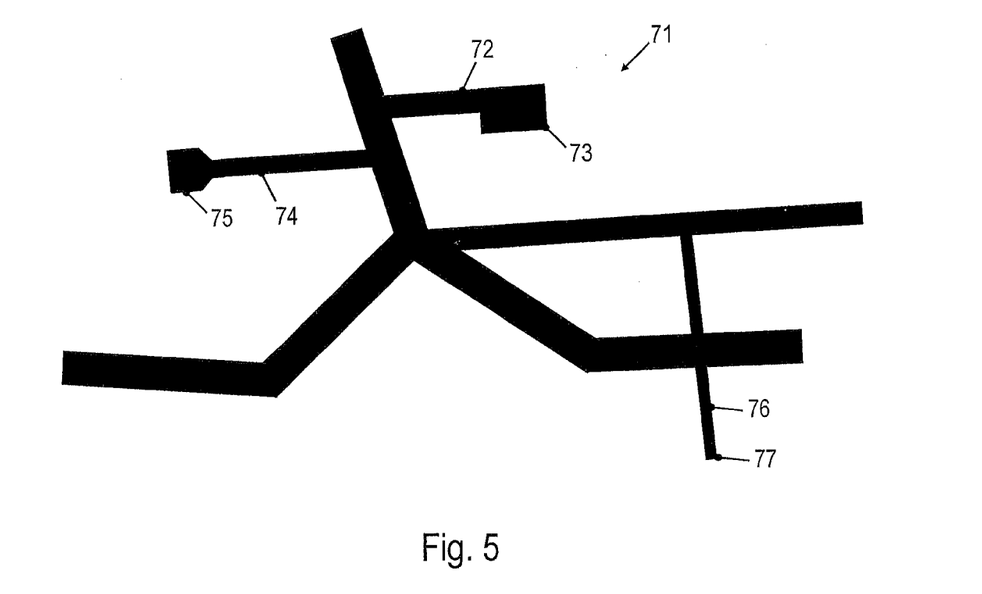
FIG. 5 illustrates a graphical representation of a road network.

FIG. 5 illustrates a road network 71 displayed using a method or device according to an embodiment. The road network includes road segments joined to other road segments on both ends. When generating the graphical representation, the road segments are generally assumed to have a constant width. The road network also includes road segments 72, 74 and 76 respectively having an end that does not allow vehicles to exit. For each one of these road segments, a map data base includes a parameter value that allows a processor to determine whether the road segment has a turning area at its end. Based on this information, it may be determined that the road segment 76 does not have a turning area at its end 77, while road segments 72 and 74 include extended portions 73, 75 representing turning areas. Additional parameter values defining the dimensions of the turning areas are stored in the map data base. Based on this information, it may be determined that the road segment 72 has a rectangular turning area 73 and that the road segment 74 has a polygonal turning area 75. The graphical representation of these road segments may be generated accordingly.

By displaying turning areas, as illustrated in FIG. 5, information on the road network is provided to the user at a greater level of detail. As the road segments 72, 74 and 76 are stored in terms of their direction vectors in the map data base, but are provided with additional parameter values, no additional road segments need to be defined to obtain a good representation of turning areas. The additional storage space required for displaying the turning areas 73, 75 can be kept moderate.

Figure 6:
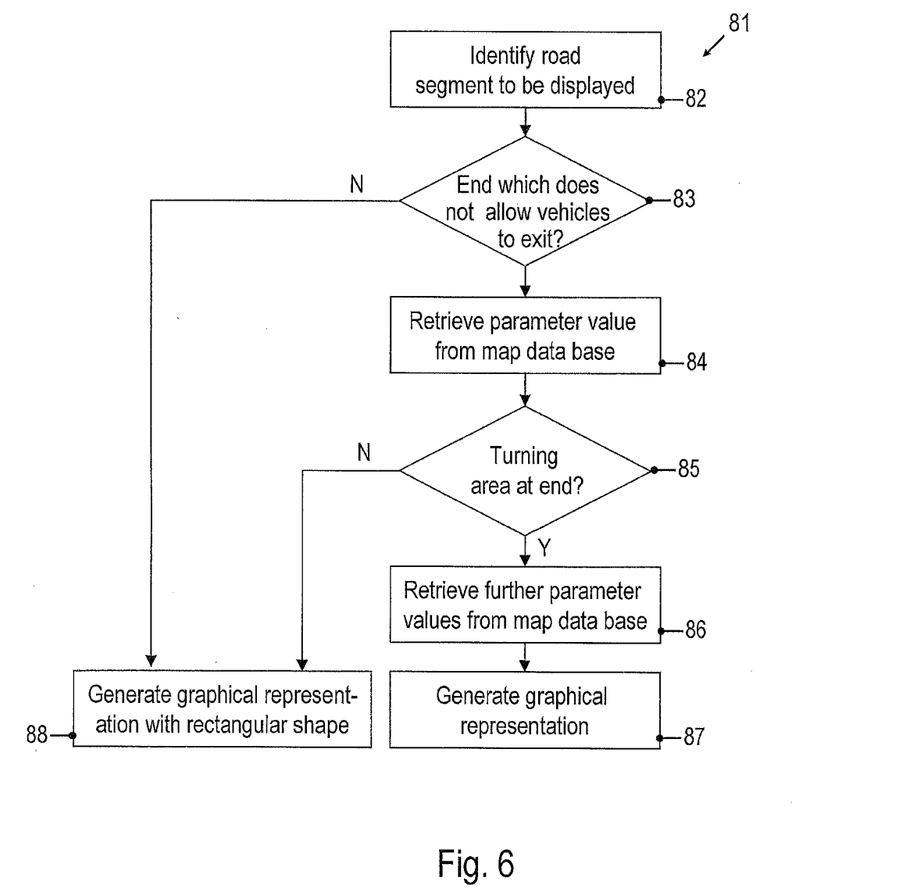
FIG. 6 is a flow diagram illustration of a method of displaying road segments.

FIG. 6 is a flow diagram illustration of a method 81 of displaying road segments. The method may be performed by the device 1 of FIG. 1. The method may utilize a map data base configured as described with reference to FIGS. 2-4.

A road segment to be displayed is identified in step 82. Identifying the road segment may be performed based on an output signal of a positioning system or based on a user input.

It is determined in step 83 whether the road segment has an end that does not allow vehicles to exit the road segment. The determining may be performed based on connectivity information in a map data base. Connectivity information may provide information on links between road segments. The determining may also be implemented based on road segment attributes. If it is determined that the road segment does not have an end at which vehicles are prohibited from leaving the road segment, the method proceeds to step 88. Otherwise, the method continues at step 84.

Referring to step 84, a parameter value associated with the identified road segment is retrieved. The retrieved parameter value is one of a finite set of possible values, which are indicative of various configurations of road segments having an end which does not allow vehicles to exit.

It is determined in step 85 whether the road segment is of a type that does not have a turning area. To this end, the parameter value retrieved in step 84 may be compared to one predefined parameter value. For example, if the parameter value corresponds to a template shape as illustrated in FIG. 3A, it will be determined that the road segment is of a type having no turning area. In this case, the method proceeds to step 88. Otherwise, the method continues at step 86.

Referring to step 86, additional parameter values associated with the identified road segment are retrieved. The additional parameter values may be retrieved from a map data base. A number of the further parameter values may be selected based on the parameter value retrieved in step 84, which is indicative of a type of the road segment. For example, if the parameter value retrieved at step 84 indicates that the road segment has a shape corresponding to the template shape illustrated in FIG. 3D, FIG. 3E, or FIG. 3I, two additional parameter values may be retrieved. If the parameter value retrieved at step 84 indicates that the road segment has a shape corresponding to the template shape illustrated in FIG. 3B, FIG. 3C, FIG. 3F, FIG. 3G, FIG. 3H or FIG. 3I, three additional parameter values may be retrieved. The additional parameter values may indicate dimensions of an end portion of the road segment at the end where vehicles cannot exit the road segment. The generic shape of the end portion may be defined by the parameter value retrieved at step 84.

A graphical representation of the road segment is generated in step 87 based on the parameter value retrieved at step 84 and the additional parameter values retrieved at step 86. Based on the parameter value retrieved at step 84 and the additional parameter values retrieved at step 86, the distances of the boundaries of the road segment from a center line of the road segment may be determined as a function of a longitudinal position along the direction vector, as specified by the map data base. The graphical representation generated at step 87 will generally be such that, in a plan view, the road segment has a width varying along its direction vector. The generated graphical representation does not have to be a plan view. If a perspective view is to be displayed, the varying width of the road segment along its direction vector will be provided to a procedure that computes perspective projection distortions prior to outputting the graphical representation.

If the road segment does not have an end where vehicles are prohibited from exiting the road segment, or if the road segment is of a type which does not have a turning area, a graphical representation of the road segment is generated at step 88. The graphical representation may be generated assuming that the road segment has a constant width as a function of position along the direction vector. The width may be set in accordance with a road class of the road segment, or in accordance with width information retrieved from a map data base. If a perspective view is to be displayed, the road segment having a constant width along its direction vector will be provided to a procedure which computes perspective projection distortions prior to outputting the graphical representation.

While a method for displaying one road segment has been explained with reference to FIG. 6, the method of FIG. 6 may generally be performed for a plurality of road segments to generate a plan view or perspective view of a portion of a road network which includes plural roads.

The methods and devices according to various embodiments provide enhanced flexibility in displaying road segments. A subset of road segments, for example road segments having an end which does not allow vehicles to exit, is provided with additional attributes for storage in a map data base. Thereby, various geometrical configurations of the road segments can be displayed to a greater level of detail, while requiring only moderate additional storage space. For illustration, to generate a graphical representation of a road segment of the type as illustrated in FIG. 3I, the map data base stores four additional parameters associated with the road segment. One of these parameters is a type parameter value indicative of the template shape illustrated in FIG. 3I. The other three parameters quantify dimensions.

Figure 7:
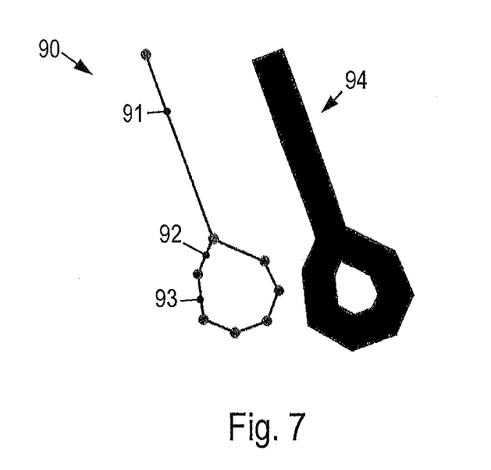
FIG. 7 illustrates a representation of a turning area according to an alternative procedure.

For comparison, FIG. 7 illustrates an alternative way to generate a graphical representation of a road which is not an embodiment of the claims. The turning area at the end of a straight portion 91 of a dead-end road 90 is segmented into a plurality of road segments 92, 93. Direction vectors for the portions 91-93 are separately stored in the map data. By displaying the plurality of road segments based on their direction information, the shape as illustrated at 94 is obtained. Information on a large number of short road segments needs to be stored in the map data base, which adds to storage space. When using the methods and devices according to embodiments, curved boundaries of turning areas or other sections of road segments having a varying width may be displayed via an optical output device to be smoothly curved, which may result in a more authentic representation as compared to the representation illustrated at 94 in FIG. 7.

The parameter value that is assigned to a road segment having an end which does not allow vehicles to exit the road segment may not only be used when displaying electronic maps. For example, the concepts explained in the context of displaying electronic maps using the parameter value that is indicative of a template shape selected from a finite set of template shapes may additionally or alternatively also be used for route search.

The parameter value indicating a template shape and, if applicable, the further parameter value(s) specifying dimensions may be used to determine whether a driver of a vehicle may be directed to enter a given road segment, which has an end that does not allow vehicles to exit. A cost model may be adjusted based on a comparison of a vehicle dimension and a characteristic size of a turning area, which is determined based on the parameter value and, if applicable, further parameter value(s) specifying dimensions.

Cost models are used in performing route search. In a route search, a route may be identified which has minimum costs among plural possible routes connecting a starting point and a destination. The costs of a route are respectively determined according to the cost model. Costs of road segments or intersections traversed on a route may be summed up, and a route may be determined to be optimum when it has the lowest overall costs as compared to other routes. Avoid and prefer options may be implemented by adjusting costs of road segments. There are a wide variety of cost models, including travel distance, travel time, fuel consumption, or similar.

The parameter value associated with a dead-end road segment, which identifies a template shape, may be used in route determination. This may reflect that a driver may not be willing to enter a dead-end road segment if there is no dedicated turning area at the end, or if the turning area has dimensions which make it challenging for the vehicle to turn. The adjustment may be done in several stages, to reflect that drivers may be willing to enter such dead-end roads if needed, but would prefer not to enter such roads. The costs of a dead-end road segment may be adjusted based on the parameter value indicating a shape template, which is associated with the respective road segment. The costs of dead-end road segments may also be adjusted based on the further parameter value(s) stored in the map data and associated with the respective road segment.

In one implementation, if the user sets an avoid option for dead-end road segments which do not have a dedicated turning area of increased width at the end, the costs in the cost model may be increased for all road segments which have a parameter value which indicates that there is no dedicated turning area at the end. For the template shapes illustrated in FIGS. 3A-3J, only the template shape 40 in FIG. 3a does not have increased diameter at the end. The costs for such road segments may be set to infinity, or to another large number, to ensure that the driver will not be directed to enter such a road segment. Compliance with the avoid option may thus be ensured.

In another implementation, if the user sets an avoid option for all dead-end road segments which do not have a loop-like turning area, as shown in FIG. 3J, the costs for all dead-end road segments may be increased if they do not have a parameter value indicative of the loop-like turning area as shown in FIG. 3J.

In another embodiment, the outer dimensions of a turning area may be computed based on the parameter value which specifies a shape template and, if available, any further parameter value(s) which specify dimensions of the turning area. For example, a dimension of a turning area along the direction vector (length) and/or a dimension of the turning area transverse to the direction vector (width) may be computed. The smaller one of the length and the width of the turning area may be compared to a vehicle length. The vehicle length may for example be permanently stored in the navigation device or may be input by a user. Based on a difference between the vehicle length and the smaller one of the length and the width of the turning area, the costs for the respective dead-end road segment may be increased. For example, if the vehicle length is greater than the smaller one of the length and the width of the turning area, the costs for the dead-end road segment may be set to a first large value, such as infinity. As a result, the outputting of driving directions may be avoided that may direct the driver to enter a dead-end road, if the vehicle cannot turn in the turning area. If the vehicle length is smaller than the smaller one of the length and the width of the turning area, but the difference is less than a threshold, the costs for the dead-end road segment may be set to a second value less than the first value. Thereby, the outputting of driving directions may be made less likely, when the driving directions would require the driver to enter a dead-end road in which it may be difficult to make a turn within the turning area.

In still other embodiments, other processing may be used. For example, as an alternative or in addition to determining a length and width of a turning area, a radius of the largest circle which can be inscribed into the turning area may be computed. The radius of this largest circle may be compared to a turning radius of the vehicle.

While embodiments have been described with reference to the drawings, various modifications may be implemented in other embodiments. For illustration, while embodiments have been described in the context of displaying the configuration of dead-end roads to a greater level of detail, embodiments may also be used in other contexts. For example, a subset of road segments of a road network which have parking bays may be provided with additional parameters in the map data base. One of the parameter values may define a shape template for a parking bay, such as square shape or trapezoidal shape, and the other parameter values may define the position of the parking bay along the road segment and/or dimensions of the parking bay.

Embodiments of the invention may be utilized to display road segments or to generate a map data base for displaying road segments. Exemplary fields of application include navigation devices for vehicles.

Although the present invention has been illustrated and described with respect to several preferred embodiments thereof, various changes, omissions and additions to the form and detail thereof, may be made therein, without departing from the spirit and scope of the invention.

What is claimed is:

1. A method of displaying road segments via an optical output device based on a map data base, which stores information on a road network in road vector data format, wherein a road segment is respectively represented by a vector, the method comprising:
    identifying a road segment for outputting via the optical output device;
    retrieving, from the map data base, information on a direction vector of the identified road segment and a parameter value associated with the identified road segment;
    selectively determining, based on the retrieved parameter value, a variation in shape of the identified road segment as a function of position along the direction vector;
    generating a graphical representation of the road segment for outputting via the optical output device based on the information on the direction vector and, if available, the determined variation in shape;
    determining, based on the map data base, whether the identified road segment has an end that does not allow vehicles to exit; and
    the retrieving the parameter value and the determining the variation in shape being selectively performed if the identified road segment has an end which does not allow vehicles to exit.

2. The method of claim 1, wherein the parameter value indicates a template shape selected from a finite set of template shapes.

3. The method of claim 2, wherein each template shape of the finite set of template shapes indicates a shape of a turning area.

4. The method of claim 1, wherein the step of generating the graphical representation includes generating a graphical representation of a turning area at an end portion of the road segment according to the determined variation in shape.

5. The method of claim 1, wherein the map data base includes data fields associated with road segments having an end that does not allow vehicles to exit the respective road segment, each one of the data fields comprising information on a direction vector of the respective road segment and the parameter value, wherein the parameter value is indicative of a template shape.

6. The method of claim 1, further comprising:
    adjusting a cost model for route determination based on the retrieved parameter value; and
    performing a route determination based on the adjusted cost model.

7. A non-transitory storage medium storing instruction code which, when executed by a processor of a computing device, directs the processor to perform the method of claim 1.

8. A method of displaying road segments via an optical output device based on a map data base, which stores information on a road network in road vector data format, wherein a road segment is respectively represented by a vector, the method comprising:
    identifying a road segment for outputting via the optical output device;
    retrieving, from the map data base, information on a direction vector of the identified road segment and a parameter value associated with the identified road segment;
    selectively determining, based on the retrieved parameter value, a variation in shape of the identified road segment as a function of position along the direction vector;
    generating a graphical representation of the road segment for outputting via the optical output device based on the information on the direction vector and, if available, the determined variation in shape; and
    selectively retrieving, based on the retrieved parameter value, from the map data base at least one additional parameter value associated with the identified road segment, the variation in shape being determined based on the retrieved parameter value and the retrieved at least one further parameter value.

9. The method of claim 8, wherein a number of the retrieved at least one additional parameter values is a function of the retrieved parameter value.

10. The method of claim 8, wherein a variation in width of the identified road segment as a function of position along its direction vector is determined based on the retrieved parameter value and the at least one further parameter value.

11. The method of claim 8, wherein a length of a section of the identified road segment in which the identified road segment exhibits the variation in shape is determined based on the at least one additional parameter value.

12. A method of displaying road segments via an optical output device based on a map data base, which stores information on a road network in road vector data format, wherein a road segment is respectively represented by a vector, the method comprising:
    identifying a road segment for outputting via the optical output device;

retrieving, from the map data base, information on a direction vector of the identified road segment and a parameter value associated with the identified road segment;

selectively determining, based on the retrieved parameter value, a variation in shape of the identified road segment as a function of position along the direction vector; and generating a graphical representation of the road segment for outputting via the optical output device based on the information on the direction vector and, if available, the determined variation in shape, wherein the graphical representation of the road segment is generated to selectively exhibit, based on the retrieved parameter value, a boundary having a curved portion.

13. A method of displaying road segments via an optical output device based on a map data base, which stores information on a road network in road vector data format, wherein a road segment is respectively represented by a vector, the method comprising:

identifying a road segment for outputting via the optical output device;

retrieving, from the map data base, information on a direction vector of the identified road segment and a parameter value associated with the identified road segment;

selectively determining, based on the retrieved parameter value, a variation in shape of the identified road segment as a function of position along the direction vector; and generating a graphical representation of the road segment for outputting via the optical output device based on the information on the direction vector and, if available, the determined variation in shape, wherein the retrieved parameter value for the identified road segment is compared to a finite set of values to determine the variation in shape of the identified road segment, each one of the finite set of values being associated with one template shape of a finite set of template shapes.

14. A vehicle navigation apparatus for displaying road segments, comprising:

a storage device configured to store map data information on a road network in road vector data format, wherein a road segment is respectively represented by a vector;

an optical output device; and a processor that identifies a road segment for outputting via the optical output device, retrieves from the storage device information on a direction vector of the identified road segment and a parameter value associated with the identified road segment, selectively determines based on the retrieved parameter value a variation in shape of the identified road segment as a function of position along the direction vector, and controls the optical output device based on the information on the direction vector and, if available, the determined variation in shape, to generate a graphical representation of the identified road segment.

15. The device of claim 14, wherein the processor is further configured to determine whether the identified road segment has an end that does not allow vehicles to exit.

16. The device of claim 15, wherein the processor is configured to retrieve the parameter value selectively if the identified road segment has an end that does not allow vehicles to exit.

17. A method of providing a map data base for vehicle navigation, wherein a direction vector is respectively stored in the map data base for a plurality of road segments, the method comprising:

receiving information on a road segment having a direction vector, the information including information on a boundary of the road segment;

determining, based on the information on the boundary, whether the road segment exhibits a variation in shape along the direction vector; and if the road segment exhibits the variation in shape, selecting a parameter value from a finite set of parameter values based on the information on the boundary and storing the selected parameter value associated with the road segment in the map data base.

18. The method of claim 17, wherein the selected parameter value indicates a template shape selected from a finite set of template shapes.

* * * * *